(12) United States Patent
Holloway

(10) Patent No.: US 7,698,854 B2
(45) Date of Patent: Apr. 20, 2010

(54) CROP PRODUCTION APPARATUS

(75) Inventor: David Holloway, Hampshire (GB)

(73) Assignee: Terraseed Ltd.

( * ) Notice: Subject to any disclaimer, the term of this patent is extended or adjusted under 35 U.S.C. 154(b) by 0 days.

(21) Appl. No.: 11/578,480

(22) PCT Filed: Apr. 14, 2005

(86) PCT No.: PCT/GB2005/001427

§ 371 (c)(1),
(2), (4) Date: Feb. 1, 2007

(87) PCT Pub. No.: WO2005/099431

PCT Pub. Date: Oct. 27, 2005

(65) Prior Publication Data

US 2007/0283621 A1 Dec. 13, 2007

(30) Foreign Application Priority Data

Apr. 14, 2004 (GB) ................................ 0408352.3

(51) Int. Cl.
*A01C 1/04* (2006.01)
(52) U.S. Cl. ......................................................... 47/56
(58) Field of Classification Search ................... 47/56, 47/5.5, 9; 111/199, 900
See application file for complete search history.

(56) References Cited

U.S. PATENT DOCUMENTS

| | | | |
|---|---|---|---|
| 2,309,702 A * | 1/1943 | Kirschenbaum | ............... 47/56 |
| 4,283,880 A | 8/1981 | Fjeldsa | |
| 5,189,833 A | 3/1993 | Clark | |
| 5,644,998 A | 7/1997 | Krolick et al. | |
| 6,446,386 B1 * | 9/2002 | Holloway | ..................... 47/56 |

FOREIGN PATENT DOCUMENTS

| | | |
|---|---|---|
| AU | 81394/75 | 11/1976 |
| FR | 2440438 | 5/1980 |
| FR | 2505607 | 11/1982 |
| FR | 2534444 | 4/1984 |
| GB | 1566161 | 4/1980 |
| GB | 2321000 | 7/1998 |
| GB | 2330998 | 5/1999 |
| JP | 3191703 | 8/1991 |
| WO | WO 96/28010 | 9/1996 |
| WO | WO 97/00003 | 1/1997 |
| WO | WO 00/67549 | 11/2000 |
| WO | WO 01/64017 | 9/2001 |
| WO | WO 2004/028237 A1 | 4/2004 |
| WO | WO 2005/002318 A1 | 1/2005 |

OTHER PUBLICATIONS

International Search Report for PCT/GB2005/001427, dated Aug. 8, 2005.

* cited by examiner

*Primary Examiner*—Michael R Mansen
*Assistant Examiner*—Monica L Williams
(74) *Attorney, Agent, or Firm*—Wolf, Greenfield & Sacks, P.C.

(57) ABSTRACT

A crop production apparatus including a flexible sheet of non-degradable or biodegradable material and a seed impregnated or carrying lower layer formed from a water-absorbent biodegradable material bonded or otherwise attached to the upper layer and removable therefrom.

17 Claims, 2 Drawing Sheets

Plan view

Figure 1, Plan view
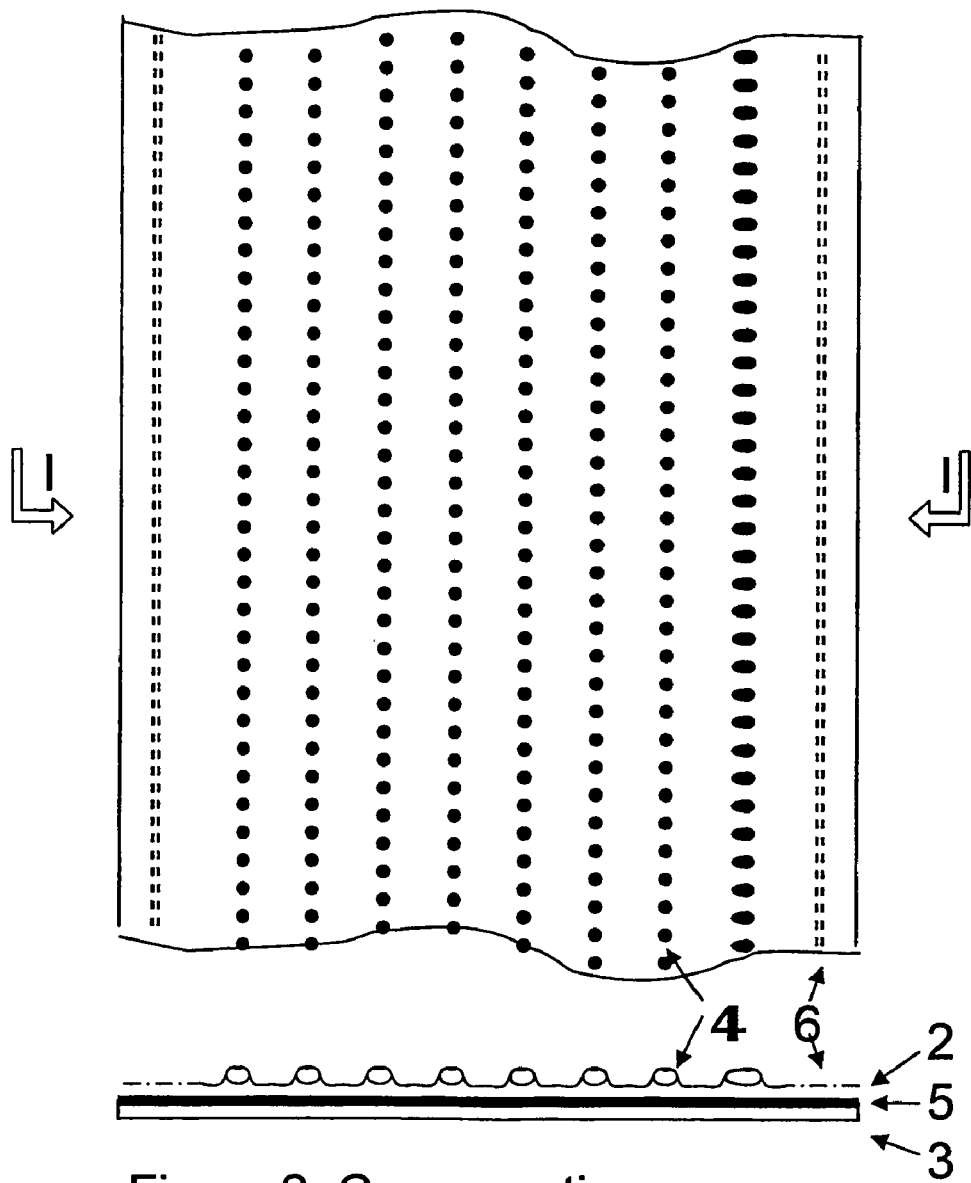
Figure 2, Cross sections before and after seedling emergence
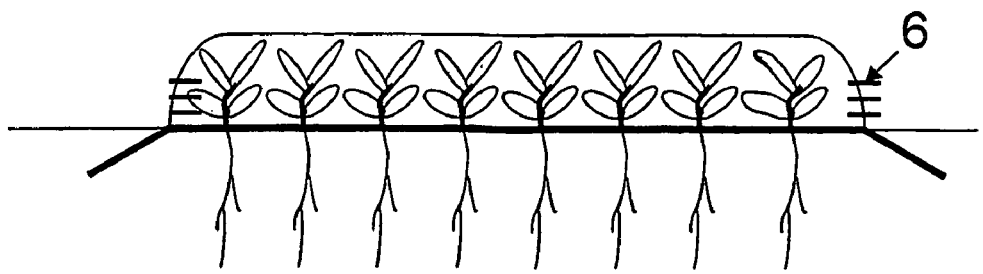

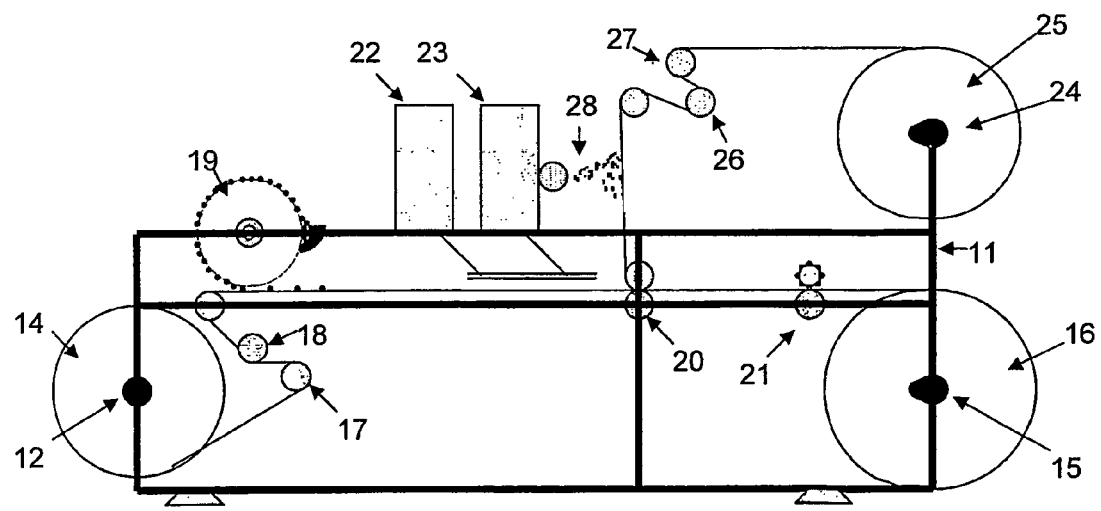
Figure 3, Apparatus for manufacturing crop production apparatus

CROP PRODUCTION APPARATUS

This invention relates to crop production apparatus for encouraging the germination and establishment of seeds, and for the control of weeds, pests and diseases in crops.

The agrochemical control of weeds, pests and disease in crops has become increasingly difficult as their registration and approval status are reviewed. The safety and environmental data used to support their original registration no longer meets the standards required for re-registration. The cost of providing new safety data to support re-registration, or of developing and registering new products is prohibitive for all but the most widely planted agricultural crops. Consequently, the range of agrochemicals available for weed, pest and disease control in minor crops (e.g. vegetables) has become very restrictive.

The use of barrier systems, genetic modification and breeding for resistance to control weeds and pests and disease has gained in importance with the loss of agrochemicals. The use of mulches to control weeds, and fleece covers to control pests, have gained in popularity and have been adopted by both conventional and organic producers with some success. Both techniques have limitations in that it is difficult to drill a crop into a weed control mulch and crop covers make access to the crop for weed control difficult.

The use of a seed mat to establish plants and control weeds has recently been developed by the applicant. This invention is for a laminated seed germination system and differs in that it comprises a detachable upper layer that allows seedlings to grow between the layers thereby controlling weeds, retaining moisture and providing protection from pests.

Various proposals have been made for seed germination media which provide the seeds with water, nutrients and protection during the germination phase.

U.S. Pat. No. 5,189,833 discloses an arrangement in which lawn grass seeds are germinated in a thin layer of growing medium sprayed over a mat of non-woven polypropylene lying on top of an impermeable membrane. After a few days of germination, the mat carrying the seed-bearing medium can be lifted, rolled and then spread over an appropriately conditioned and prepared lawn bed.

Australian Patent Application AU-A-81394/75 discloses a seed bearing mat comprising upper and lower layers bonded together with a latex adhesive, seeds being bonded between the layers. The lower layer is a water permeable material such as straw, coconut fibres, peat moss or wood shavings whilst the upper or covering layer is formed from materials of a finer texture than the lower layer such as coconut fibre dust or sawdust bonded together by latex. The seed bearing mat of AU-A-81394/75 is described as being particularly useful in preparing lawns.

French Patent Application FR-A-2505607 discloses a non-laminar seed germination medium comprising a folded layer of transparent plastics material such as polyethylene having bonded to the edges of the underside thereof a water-soluble or degradable seed-bearing medium such as paper. In use, the seeds germinate beneath the transparent plastics layer and, as the seedlings grow, they lift the transparent layer away from the water-soluble/degradable medium. Thus the transparent layer is gradually unfolded and carried upwards by the growing seedlings and therefore remains in place over the top of the plants to maintain a greenhouse effect. There are, however, no perforations or lines of weakness in its film thus restricting air movement, irrigation and easy removal of the covering layer before harvest, thereby distinguishing this product from that of the present application.

French Patent Application FR-A-2440438 discloses a peat-based seed bearing medium comprising a lower layer formed of a water-permeable fibrous material such as cellulose fibres of muslin cloth, an intermediate layer of peat containing seeds and any additives; and optionally an upper layer which is also water-permeable and can be formed from a material such as muslin.

International Patent Application WO-A-96/28010 discloses a seed germination medium in sheet form having upper and lower layers and seeds disposed therebetween. The upper and lower layers are preferably formed from a biodegradable paper material. In order to assist anchoring of the medium in the underlying soil or, i n the case of desert areas, sand, the medium is slit longitudinally to enable it to be stretched laterally to form an open lattice. However, it has been found that a problem with the lattice arrangement disclosed in WO-A-28010 is that it has a tendency to dry out too quickly. In particular, when stretched to open out the lattice, the edges of the lattice openings lift exposing the lower layer of the medium and increasing water loss. Also), the lifting of the edges of the lattice results in the seeds being lifted away from the soil which acts to inhibit germination of the seedlings, possibly through build up of ethylene in the medium.

British Patent Application No. GB 1566161 discloses a seed germination medium comprising an upper layer formed from a paper having a weight of 18 g/m$^2$, a lower layer formed of a water absorbent biodegradable material and seeds disposed therebetween. However, a problem with the seed germination media of GB 1566161 is that they tend to dry out too quickly in adverse environmental conditions.

French Patent Application No. FR 2534444 discloses a seed germination medium comprising a layer of polyethylene, for example, to which is attached on the underside one or more seed bearing strips of a substantially water soluble material. Careful positioning of the lower strip or strips facilitates the accurate positioning of the seeds in depressions formed in pre-prepared soil. One disadvantage with the seed germination medium of FR 2534444 is that a great deal of effort is required to accurately place the seeds in position in the pre-prepared soil.

The problems which arise from the seed germination media disclosed in these documents are at least alleviated by the seed germination media disclosed in our British Patent GB 2330998 and International Application WO 00/67549. GB 2330998 discloses a seed germination medium which comprises an upper layer formed from a biodegradable material which is permeable to gases and permeable to water vapour, but is substantially impermeable to water in liquid form and provides some barrier properties with respect to water vapour. A lower layer is formed from a water-absorbent biodegradable material bonded to the upper layer to form a laminar structure; seeds are disposed beneath the upper layer and the upper layer has a plurality of perforations through which seedlings germinating from the seeds can grow.

One disadvantage of the seed germination media of our earlier Patent is that the upper layer degrades relative slowly, and only after incorporation into the soil. Non-degradable film materials like polyethylene and PVC can be used but need to be removed on completion of the growing cycle. Furthermore, the upper layer is permanently bonded to the lower layer and cannot, therefore, be removed during the growing cycle without damaging the lower layer and the germinating seeds or plants growing from the lower layer. As a result, neither layer is capable of being recycled.

Accordingly, in a first aspect, the invention provides crop production apparatus including an upper layer comprising a flexible sheet of non-degradable or biodegradable material and a seed impregnated or carrying lower layer formed from a water-absorbent biodegradable material bonded or otherwise attached to the upper layer and removable therefrom.

Removal may be facilitated by providing lines of weakness running lengthwise down the edges of the upper layer.

The upper layer may comprise a flexible sheet of non-degradable polyethylene, totally degradable polyethylene (TDPE), a biodegradable starch film, non-degradable PVC and degradable PVC or like material.

The thickness of the upper layer is preferably no greater than 20μ. A preferred thickness range is 6 to 15μ for polyethylene and PVC and 15 to 20μ for a starch film.

The lines of weakness preferably extend over the full length of each side portion of the lower or upper layer and may each comprise a linear series of perforations. In an alternative arrangement, the lines of weakness comprise linear areas of reduced thickness. Preferably, the lines of weakness extend along the side edges of the lower layer and are covered with soil when the apparatus is installed.

In an alternative embodiment, the lines of weakness are created by selection of an adherent which degrades with time and/or in response to climatic conditions or irrigation. In such an arrangement, the layers separate naturally in time and/or in response to climatic conditions.

The upper layer may be formed with a plurality of vents or perforations through which air, water (e.g. rain) or water vapour can pass. Preferably, these vents or perforations are sited at locations between or to one side of rows of seeds or seedlings positioned below the upper layer. In this way, water entering the apparatus is transferred horizontally via the lower layer to the seeds or seedlings thus preventing their emergence through the upper layers.

For starch films, such vents or perforations may not be required because of the porosity of such films.

The lower layer can also be provided with a plurality of perforations remote from its side edges to enable roots emerging from the seeds to grow therethrough.

The upper and lower layers are typically bonded together by the use of heat or by means of an adhesive of one type or another. The adhesive is typically one which is non-phytotoxic and water-based. Examples of such adhesives are starch, starch derivatives, dextrins, polyvinyl alcohol (PVA) and ethylene vinyl acetate (EVA), optionally in combination with other adhesives. As mentioned previously, the adhesive and the amount of adhesive used may be selected to cause the layers to separate after a given time period or in response to climatic conditions. In these circumstances, a starch or starch derivative would be preferred. Where heat is used to bond layers together the lower layer is treated to a temperature between 120° C. and 150° C. prior to lamination. Hot rollers or infrared light is typically used to heat the materials. The temperature and areas of heating will determine the rate at which the upper layer separates from the lower layer after laying.

The lower layer may be made from a wide range of biodegradable materials including air-laid paper, e.g. an air-laid latex bonded paper, for example a paper formed from fluff pulp and a latex binder; waste or recycled paper, or other fibre-based or waste products. The selection of a suitable absorbent material for the lower layer will be dependent on cost, availability of raw materials and water for irrigation; the soil type, irrigation method, degree of capillarity required and the amount of water which must be retained in the medium to facilitate establishment of the seedling. In one preferred embodiment, 45-100 gm/m$^2$ air-laid paper is used to form the lower layer, one such form of material being available from Buckeye Technologies, Ireland. Such air-laid papers typically contain approximately 85% fluff pulp and 15% latex binder, although greater or lesser amounts of binder can be used as desired. Where availability of water is not a limiting factor, the lower layer may be relatively non-absorbent, e.g. may be formed from standard tissue or other recycled material.

The lower layer can be a single layer or it can comprise a plurality of layers that may be embossed or printed together. The upper and/or lower layer can advantageously be colored or treated to change the wavelength of light passing through or reflected from it. This can be used to manipulate climatic conditions (e.g. to absorb or reflect heat) and to suppress weed growth below the medium. For example, the medium, or a least the surfaces thereof, can be provided in a variety of colors to assist soil warming/cooling or to exclude light so as to suppress weed growth and aid plant establishment. The medium may have different colors on its upper and lower surfaces to enhance or reduce the absorption of radiation on one surface and produce the opposite effect on its other surface. The addition of UV filters has been shown to reduce the spread of disease, and filters which change the ratio of red to far-red light have been shown to change the growth habits of plants.

In addition to the seeds, a range of optional material s can be disposed beneath the upper layer.

For example, fertilisers, micro-nutrients (such as zinc, copper, boron, and seaweed extracts), vitamins, humic acid, sea kelp, sugars, amino acids, plant growth promoters and hormones, pH-regulators such as lime and sulphur, salt binding agents such as gypsum (calcium sulphate) and adsorbents such as activated carbon can be incorporated into the medium either by formulating with the adhesive or by application directly to one or other of the internal surfaces as a spray, granule or dust. The pH-controlling agents can be used to control the acidity of the immediate environment, and agents such as gypsum and activated charcoal can minimise the impact of adverse chemical contaminants and salt in the soil or medium, as well as to improve germination, and/or to aid and accelerate plant establishment. Salt binding compounds, buffering and pH regulating compounds and adsorbents typically are applied at between about 20 gsm and 200 gsm, more usually 50 to 150 gsm, for example approximately 100 gsm. In the case of the adsorbent, activate carbon, lower concentrations are typically used.

Buffering and other chemical or organic agents counteract the impact of adverse chemical contaminants in the soil or medium, as well as improving germination, and/or aiding and accelerating plant establishment. Thus, for example, lime provides a buffer against low pH, gypsum provides a means of counteracting high salinity, whereas clay minerals such as zeolite, kaolinite, calcium bentonite and montmorillonite counteract high levels of fertiliser or chemical contamination in the soil.

Fertiliser and micronutrients may be added to the medium either by incorporation with the adhesive or applied directly to one or other of the internal surfaces as a spray, granule or dust. If applied at high levels, fertilisers will produce a high level of EC (electro-conductivity) in the medium, which will scorch and kill emerging seedlings. Consequently the rate of application, the type of fertiliser used and the rate of release generally require careful control. Typically, organic based fertilisers are used since such fertilisers release nitrogen more slowly allowing higher rates to be included in the medium with risk of damage to seedlings. A typical application would be of a granular, organic-based material at between 10 and 100 grammes per square metre (gsm), more typically 30-80 gsm. Fertilisers can vary considerably in their potassium, phosphorous and nitrogen contents, but one fertiliser useful in the media of the invention contains 16% nitrogen, 10% phosphorous and 10% potassium plus micro-nutrients.

Water retaining substances and wetting agents, which can be synthetic or natural materials (such as clay minerals, e.g. sodium bentonite (which can be applied at up to 100 gsm), or gelatine products, or surfactants such as non-ionic, anionic, cationic and amphoteric surfactants or other wetting adjuvants), can be included to increase the water absorbency of the medium. Examples of such water-retaining substances includes polymeric gels such as polyoxyethylene gels (PEO), silica gels and so-called "super absorbents" such as super absorbent acrylic polymers (e.g. polacrylamide), which may be added to the medium at between 5 and 100 gsm, preferably 10 to 40 gsm, for example up to about 30 gsm depending on use. Polyacrylamide is available for agricultural use from a range of suppliers including, for example, Glowcroft Ltd. Polyoxyethylene gels, which are particularly preferred in very hostile environments such as highly saline soils, can be obtained from SmartTech Limited of Glasgow, UK, a particular PEO gel being cross-linked polyethylene oxide co-polyurethane hydrogel.

In the case of wetting agents, these assist in dispersing the water throughout the medium, and allow less absorbent forms of paper or other substrate to be used.

Thus, an advantage of crop production apparatus in accordance with the invention is that it improves water utilisation. As such, it can be used to reduce the water requirement in situations (such as rice growing) where relatively large amounts of water may normally be required either to enable germination to take place or to suppress weed growth. Furthermore, not only can the crop production apparatus advantageously be used to enable growth to take place in hostile terrains, but it can also be used in more temperate conditions, for example in agriculture and horticulture, for example in growing sweetcorn, soya and salad crops.

Pesticides (e.g. herbicides, fungicides, insecticides and nematicides etc) can be incorporated beneath the upper layer and preferably between the layers. Although pesticide/micro-nutrient treated seed can be used, the pesticides can alternatively or additionally be incorporated into, or adsorbed or absorbed onto, the medium. This may reduce the concentration of pesticide (and fertiliser) in direct contact with the seed allowing a broader range of products to be used at higher rates without causing phytotoxicity, reducing the requirement for field applications and dose of active ingredient.

The seeds and optionally seeding agents such as propagation agents of plant, animal and fungal origin can be bonded or held by physical pressure at a pre-determined density between the layers of the medium. The density of seeding will typically depend upon the required plant population and environmental or field factors, for example. The seeds can advantageously be treated with pesticides of the type referred to hereinabove.

Where the lower layer is formed from a plurality of sheets, each separate layer can be impregnated with or carry a different addictive. Thus, for example, an upper sheet can carry the seeds whilst plant nutrients can be carried by an underlying sheet.

Biological agents such as bacterial spores and fungal propagation agents (e.g. mycorrhizae) or other propagation agents may be used to encourage plant establishment in hostile environments and/or provide a means of biodegradation of the upper and lower layers. Bacteria and soil fungi can buffer seedlings against soil contaminants (e.g. heavy petals) and may be incorporated to attack the upper and/or lower layers to encourage breakdown and the break through of seedlings. Typical biological agents may include any one or more of the following:

(a) vesicular arbuscular mycorrhiza fungi which will form symbiotic associations with the emerging roots and soil bacteria to encourage establishment, especially in extreme conditions (e.g. Mycor manufacture by Plant Health Care Inc. or Symbio Limited of Great Bookham, UK);

(b) *Pseudomonas* spp. which are nitrogen fixing and which will encourage seed germination;

(c) *Bacillus* spp. to enhance seeding and encourage the development of organic matter in the soil;

(d) *Streptomycetaceas* spp. or *Trichoderma* spp. to discourage the build-up of disease in the medium (e) other phosphorous solubilising and nitrogen fixing bacteria; and (f) bacteria or fungi bred or selected to lock up, solubilise or inactivate a specific range soil contaminants such as hydrocarbons, toxic substances e.g. cyanide and heavy metals; and (g) other microorganisms which degrade celluloses, starch and other polysaccharides.

Mixtures of bacterial plant growth activators that can be used in the seed germination apparatus include commercially available products such as "BioPak" (manufactured by Plant Health Care Inc) and "Organica" Plant Growth Activator (manufactured by Organica Ltd).

Depending upon the material used, bonding of the upper and lower layers can create a trans-laminar effect, which greatly enhances the movement of water across the medium from an irrigation source. The use of a semi-permeable layer on top reduces water loss from the absorbent layer, and super absorbents between layers reducing water demand.

The apparatus of the invention can be provided with and/or used in conjunction with irrigation tubes. For example, one or more irrigation tubes can be sandwich between the upper and lower layers or bonded to one or both of the exterior surfaces of the media. The irrigation tubes can be used together with solar pumps, for example, or heat sensitive mechanical pumps which control the distribution of water in accordance with the requirements of the media in a given set of environmental conditions. Irrigation tubes can include trickle irrigation tubes which can be polymeric tubes having perforations along their length, or tubes formed by folding sheets of a polymeric material such as polyethylene and tacking the edges together to form a leaky seam through which water can escape during use.

The invention will now be illustrated by way of example only, with reference to the accompanying diagrammatic drawings in which:

FIG. 1 is a plan view of a length of a seed germination medium of crop production apparatus according to one embodiment of the invention;

FIG. 2 shows cross-sections taken along line I-I of FIG. 1 before and after the emergence of seedlings; and FIG. 3 illustrates manufacturing apparatus in accordance with the invention.

Referring now to FIGS. 1 and 2, a crop production apparatus according to one embodiment of the invention includes a seed germination medium 1, having an upper layer 2 and a lower layer 3 secured to the upper layer along the longitudinally side edges of the layers. Upper layer 2 is formed from a sheet of biodegradable polyethylene and is formed with vents or perforations through which air, rain water and water vapour can pass.

The upper layer comprises a flexible sheet or film of a non-degradable or degradable material, such as polyethylene or starch. The thickness of the upper layer is preferably no greater than 20μ, typically between 6 and 15μ for polyethylene and between 15 and 18μ for starch.

Disposed between the upper and lower layers 2, 3 are seeds 4 which may optionally be coated (e.g. with one or more pesticides). Other desirable agents can also be disposed between the layers, examples being super-absorbent substances for increasing the water carrying/retaining capacity of the medium (such as "SwellGel"—available from Glowcroft Ltd, Gloucester, UK), buffering agents, and beneficial bacteria and fungi as described above.

Because any pesticides are retained between the two layers of the seed germination medium, contamination of the local environment is avoided.

The upper and lower layers 2, 3 are bonded together by means of an adhesive layer 5 which, typically, comprises a biodegradable starch supplement or PVA. The adhesive can contain one or more agents such as pesticides (for example herbicides, fungicides, insecticides, nematicides), plant micronutrients (such as zinc, copper, boron), organic and inorganic fertilisers, plant growth regulators (e.g. seaweed extract), plant growth promoters and hormones, buffering agents and pH regulators (e.g. lime and sulphur), and salt binding agents such as gypsum (calcium sulphate) and microbial species beneficial to plant growth and development and/or which degrade cellulose or other polysaccharides so as to bring about controlled biodegradation of the lower layer.

Longitudinally extending lines of weakness 6 are introduced into the upper layer 3 along its entire length at positions close to the bonding layers 5. As shown, these weakness lines comprise a linear array of perforations. Alternatively, the thickness of each line may be less than that of the thickness of the remainder of the sheet. In a further alternative arrangement, the bonding agent selected to attach the upper and lower layers together may degrade over a relatively short period of time or in response to climatic conditions, thereby reducing or removing the attachment between the two layers. The lines of weakness enable the upper layer to be separated from the lower layer, once seed germination and establishment have been effected, simply by pulling the upper layer over and away from the lower layer. The removed upper layer can be recycled for future use.

Apparatus for manufacturing a crop production apparatus in accordance with invention typically comprises a frame 11 to which are rotatably secured a spindle and brake assembly 12 carrying a roll 14 of the air-laid paper which will constitute the lower layer 3 and a spindle 15 and roll core, upon which the finished apparatus 16 is collected. Located between the spindles in sequence, guide rollers 17, tension rollers 18, a drum seeder station 19, baffles, a bonding station comprising a pair of laminating rollers 20, and a pair of cutter rollers 21. A seed dispensing hopper 22 and granule applicator 23 are mounted above the first web immediately upstream of the bonding station, and are connected to the baffles by means of chutes.

Mounted above the product collecting spindle 15 is a spindle 24 and brake assembly upon which is mounted a roll 25 of the plastic film which will constitute the upper layer of the germination apparatus. Disposed between the spindle and the laminating rollers at the bonding station is a tension monitoring assembly 26, guide rollers 27 and adhesive spray head 28 connected to a supply of aqueous adhesive (not shown). Perforations are formed in the side portions of the plastic sheet to define lines of weakness. These may be formed by mechanical cutter rollers or electrically heated rollers. Alternatively, a hot wire technique may be employed.

In use, a web of the air-laid paper is pulled through the machine by means of a powered drive shaft driven through the laminating rollers 20 on the product collecting spindle 15. The web is drawn past the adhesive applicator, such that a thin film of adhesive is applied to the upper web while the lower web passes under the seed drum where seeds are deposited onto the web from the drum. The web then moves along beneath the baffles where granules of a composition containing a super-absorbent polymer, other desired additives such as buffers, and beneficial microbial species are dispensed from granule applicator. At this point, as an alternative (or addition) to using the drum seeder, the seed dispensing hopper may be used to deposit seeds onto the web. The baffles serve to guide the granules and seeds into longitudinal parallel rows.

At the bonding station, the web forming the upper layer of the medium which has previously been coated with an adhesive by means of an adhesive applicator converges with the lower web. The two webs are drawn between the rollers and compressed to bond them together. By configuring the rollers and baffles correctly, the seeds and other material can be introduced onto the web in rows such that compression and lamination takes place either side of each row. This prevents any damages to the seeds as a result of the action of the rollers, and also ensures that a more secure bond is formed between the two webs at the locations where there are no seeds or other materials.

The size of the rolls of seed germination medium formed according to the foregoing process will depend upon the raw materials, the intended method of laying (by agricultural machinery or by hand), and the area intended to be covered. However, purely by way of example, the rolls can be up to 2.0 metres wide, 500 metres in length, and may cover up to about 100 m$^2$ or more.

The crop production apparatus of the invention can be laid using existing agricultural or horticultural equipment, for example the machinery typically used for laying polyethylene sheeting, or crop mulching equipment. In general, the soil or ground can be prepared in advance of the laying to produce a relatively smooth clod free bed. Furrows are then opened up on either side of the medium and the medium is partially buried. Burying the edges of the apparatus helps to hold it in place against the action of, for example, winds. Trickle irrigation tubes can be incorporated at laying or the lower layer may be wetted utilising overhead, ditch or flood irrigation. As much of the lower layer as possible should be covered to assist establishment and reduce water consumption although the medium can be laid on the surface if necessary and an appropriate securing system used. Once wetted, the medium will retain moisture to allow the seeds to germinate. Ideally little or no further moisture should be applied to encourage rapid deep rooting and self sustainability. However, this may not be practical in all situations and additional water may be required. As an alternative to trickle irrigation, a form of flood irrigation could be used by laying the medium into a depression in the ground, which may be formed manually or by the equipment used to lay the medium, and allowing or causing water to run over the surface of the upper layer.

The advantage of the apparatus of the present invention is that it provides a protected local environment which is favourable to the germination of seeds and the subsequent development of seedlings. The apparatus has a substantially reduced water demand compared to conventional overhead trickle irrigation systems, and can be applied to land using existing plastics/mulch laying equipment. A further benefit of the apparatus is its compatibility with existing trickle, overhead, trench and flood irrigation systems. If desired, however, a trickle irrigation system can be incorporated into the apparatus at manufacture. Further substantial advantages are the ease of manufacture of the apparatus and its long shelf life. Moreover, the medium can be used in both hostile and normal agricultural situations.

It will be appreciated that the foregoing is merely exemplary of crop production apparatus in accordance with the invention and that modifications can readily be made thereto without departing from the true scope of the invention.

The invention claimed is:

1. A crop production apparatus including an upper layer comprising a flexible sheet of non-degradable or biodegradable material and a seed impregnated or carrying lower layer formed from a water-absorbent biodegradable material that is bonded or otherwise attached to the upper layer, the lower layer being removable from the upper layer by pulling the upper layer away from the lower layer without damaging the lower layer, the upper layer including two side portions and a main portion that run lengthwise along the upper layer with each side portion located adjacent an edge of the upper layer and the main portion located between the side portions, the main portion having a width that extends across a substantial portion of the upper layer, the upper layer including lines of weakness located only in each side portion and running lengthwise down the edges of the upper layer to render the side portions weaker than the main portion to facilitate removal of the upper layer from the lower layer, the main portion being free of lines of weakness.

2. The crop production apparatus according to claim 1, wherein the upper layer comprises a flexible sheet of non-degradable polyethylene, totally degradable polyethylene (TDPE), a biodegradable starch film, non-degradable PVC, degradable PVC or like material.

3. The crop production apparatus according to claim 1, wherein the thickness of the upper layer is no greater than around 20μ.

4. The crop production apparatus according to claim 3, wherein the thickness range is 6 to 15μ for polyethylene and PVC and 15 to 20μ for a starch film.

5. The crop production apparatus according to claim 1, wherein the lines of weakness extend generally over the full length of each side portion of the upper layer and each comprise a linear series of perforations.

6. The crop production apparatus according to claim 1, wherein the lines of weakness comprise linear areas of reduced thickness.

7. The crop production apparatus according to claim 6, wherein the lines of weakness extend along the side edges of the lower layer and are covered with soil when the apparatus is installed.

8. The crop production apparatus according to claim 1, wherein the upper layer may be formed with a plurality of vents or perforations through which air, water (e. g. rain) or water vapour can pass.

9. The crop production apparatus according to claim 8, wherein the vents or perforations are sited at locations between or to one side of rows of seeds or seedlings positioned below the upper layer.

10. The crop production apparatus according to claim 1, wherein the lower layer is provided with a plurality of perforations remote from its side edges to enable roots emerging from the seeds to grow therethrough.

11. The crop production apparatus according to claim 1, wherein the upper and lower layers are typically bonded together by the use of heat or by means of an adhesive of one type or another.

12. The crop production apparatus according to claim 11, wherein the adhesive is one which is non-phytotoxic and water-based.

13. The crop production apparatus according to claim 1, wherein the lower layer may be made from a wide range of biodegradable materials including air-laid latex bonded paper.

14. The crop production apparatus according to claim 13, wherein the lower layer is made from paper formed from fluff pulp and a latex binder.

15. The crop production apparatus according to claim 13, wherein the lower layer is formed from 5-100 gm/m$^2$ air-laid paper containing approximately 85% fluff pulp and 15% latex binder.

16. The crop production apparatus according to claim 1, wherein the lower layer comprises a plurality of layers that may be embossed or printed together.

17. The crop production apparatus according to claim 1, wherein the upper and/or lower layer is colored or treated to change the wavelength of light passing through or reflected from it.

* * * * *